United States Patent [19]
Sidey

[11] Patent Number: 5,952,743
[45] Date of Patent: Sep. 14, 1999

[54] ELECTRIC MOTOR

[76] Inventor: Roger Charles Hey Sidey, 39B Cambridge Park, East Twickenham, London, United Kingdom, TW1 2JU

[21] Appl. No.: 09/029,754
[22] PCT Filed: Aug. 29, 1996
[86] PCT No.: PCT/GB96/02133
  § 371 Date: Mar. 2, 1998
  § 102(e) Date: Mar. 2, 1998
[87] PCT Pub. No.: WO97/08806
  PCT Pub. Date: Mar. 6, 1997

[30]  Foreign Application Priority Data

Aug. 29, 1995 [GB] United Kingdom .................. 9517603

[51] Int. Cl.$^6$ ................................................. H02K 41/00
[52] U.S. Cl. .............................................................. 310/12
[58] Field of Search ................................ 310/12, 13, 14; 318/135

[56]  References Cited

U.S. PATENT DOCUMENTS 5,345,206  9/1994  Morcos .................................. 310/13 X

FOREIGN PATENT DOCUMENTS

A2-0-258-569  3/1988  European Pat. Off. .
2214724  9/1989  United Kingdom .
WO95/31851  11/1995  WIPO .

OTHER PUBLICATIONS

Patent Abstracts of Japan, vol. 007, No. 170 (E–189), Jul. 27, 1983 & JP,A,58 075458 (Yoshiteru Takahashi), May 7, 1983 (Abstract Only).
Patent Abstracts of Japan, vol. 006, No. 021 (E–093), Feb. 6, 1982 & JP,A,56 141769 (Sato Ryoda), Nov. 5, 1981 (Abstract Only).

*Primary Examiner*—Nestor Ramirez
*Assistant Examiner*—Judson H. Jones
*Attorney, Agent, or Firm*—Oliff & Berridge, PLC

[57]  ABSTRACT

A linear permanent magnet electric motor whose poles are extended by pole-pieces of high permeability material to provide the armature or moving element of the assembly. Two groups of two windings are positioned symmetrically about the nominal geometric center of each of the pole-pieces and hence nominal center of magnetic saliency. Thus, the device is capable of being a combined motor and position sensor as well as a device capable of combining linear velocity and linear position sensing.

10 Claims, 3 Drawing Sheets

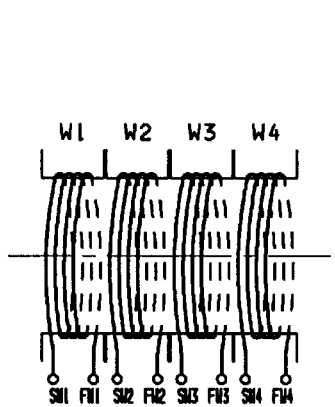
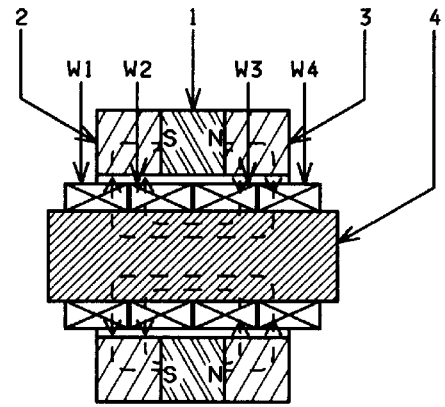
Fig.6A  Fig.6
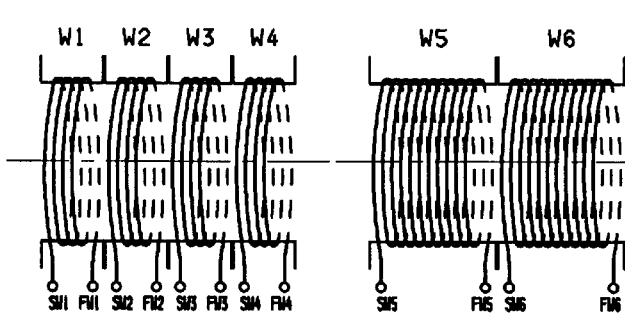
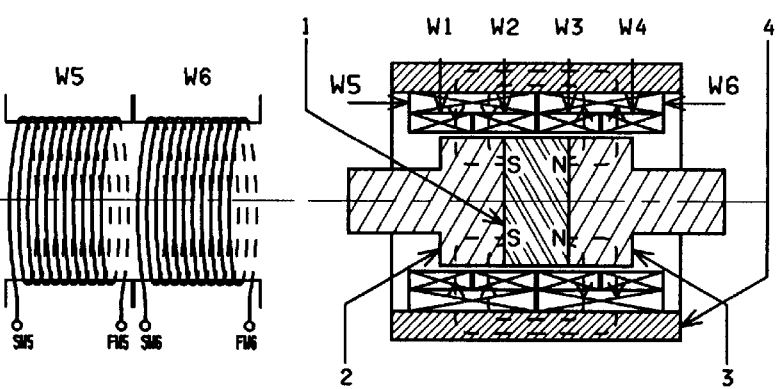
Fig.7A  Fig.7B  Fig.7

ELECTRIC MOTOR

The present invention relates to an electric motor, for instance of the linear electromagnetic type, comprising an integral position measurement system for providing force or thrust in response to an electrical current.

The provision of an integral position measurement system greatly enhances the applications of such motors, allowing them to provide information on the output movement produced and to be servo position controlled. Applications for such motors include industrial automation, instrumentation, proportional valve control, vibration testing, pumping and metering.

FIG. 1 of the accompanying drawing shows a linear motor of the type particularly relevant to this invention, this being described in a prior GB Patent application 8801924. The main elements of the motor are a moving assembly comprising a permanent magnet 1, pole-pieces 2 and 3, split stationary windings W1 and W2, and a soft iron magnetic return circuit formed by an outer shell 4. Magnetic flux due to the permanent magnet 1 is forced to flow radially between the pole-pieces 2, 3 and the outer shell 4 and thus to traverse the windings W1, W2 substantially at right angles to the direction of current flow in the windings W1, W2. It can be appreciated that the direction of magnetic flux is opposite for the two pole-pieces 3, 4, these being arranged at the North and South polarity ends of the magnet 1. Thus in order for the current flow in the windings W1, W2 to produce a consistent or net force on the moving assembly it is necessary that the direction of current flow in the two windings WI, W2 surrounding the pole-pieces 3, 4 be mutually opposite. It is for this reason the winding in the motor of FIG. 1 is split or comprises two separate windings W1, W2 surrounding the pole-pieces 3, 4. Providing the correct direction of current flow is achieved, the windings W1, W2 may be series or parallel connected to provide a two terminal connection to the driving source.

To make efficient use of the permanent magnet 1 and winding material, the windings W1, W2 must be arranged substantially as shown in FIG. 1. Here the windings are arranged to fill a significant portion of the radial gap around each pole-piece 3, 4 and to overlap each pole-piece 3, 4 by a given amount in the axial direction. In this way the flux produced by the permanent magnet 1 is forced to flow across the windings W1, W2 and to contribute to the production of output thrust. The overlap of windings W1, W2 is used to encompass leakage or stray flux but is also necessary to allow movement of the magnet and pole-piece assembly without substantial change in the amount of flux linked by the windings W1, W2. For short stroke linear motors of this type it can be seen that the windings are very effectively used in linking the working permanent magnet flux of the machine and thus contributing to an overall high electrodynamic efficiency. Any reduction in the volume of the windings or the consistency of flux linking due to the introduction of additional windings or electrodes for the provision of position measurement of the moving assembly, will reduce the effective working volume of the windings and thus degrade the force output and efficiency of the machine.

These features of the motor make it difficult to use the simple split winding arrangement to perform the additional function of position measurement. In GB Patent application 8801924 the windings are shown series connected, this resulting in a centre connection node. The winding ends are driven, in addition to the thrust producing current, by an AC energising signal, this being applied as anti-phase EMFs impressed on the ends of the windings. Here the moving assembly is intended to function as a magnetically salient object, the movement of which produces differential changes in inductance of the two windings. This differential inductance change results in an imbalance of the impedance of the windings and a corresponding output at the centre tap of the windings of a fraction of the AC energising voltage.

With this arrangement there is a conflict between the requirements for production of optimum output force with high efficiency and for establishing a useable differential inductance to determine movement of the motor armature. The symmetrical positioning of the windings about the pole-pieces in the axial direction and the necessary overlap of the pole-pieces make the inductance change negligible. Without significantly offsetting the windings from the position and configuration for optimum electrodynamic efficiency, the attainable transducer signals are of minimal amplitude.

The present invention sets out to provide a motor and winding arrangement in which a useable differential inductance can be achieved whilst maintaining optimum electrodynamic efficiency.

According to the invention there is provided an electric motor comprising: a magnetic circuit formed by a permanently magnetised element with first and second soft magnetic pole-pieces; a magnetic return element providing a path via which flux flows between the pole-pieces, the said pole-pieces respectively defining, in conjunction with the magnetic return element, first and second radial gaps across which the permanent magnetic flux flows; and a system of windings positioned in the radial gaps and arranged in two groups of two windings; such that each group is positioned symmetrically about the nominal geometric centre and hence nominal centre of magnetic saliency of the first and second pole-piece elements.

It will therefore be seen that, by an embodiment of the present invention, the above described compromise is avoided altogether. An alternative winding configuration is used to satisfy jointly the requirements of efficient and optimised force output and of effective position measurement. This arrangement takes account of the fact that the material comprising the permanent magnet element possesses a relatively low incremental permeability compared to the material of the pole-pieces. The second division of windings about the centre of the pole-pieces allows this magnetic saliency of the individual pole-pieces to cause significant differential inductance change between selected members of the winding elements with armature movement.

The overall volume and disposition of the windings about the pole-pieces is not significantly changed by this arrangement and providing, as is the case, the steady or DC current flow in the windings is arranged to provide consistent force output, the efficiency and thrust output of the machine is not degraded.

It is thus possible to provide a completely integral motor and position measurement system without compromise of thrust output or of electrodynamic efficiency and without significant compromise of position measurement sensitivity.

A further benefit of the present invention is that, in addition to providing a combined motor and position measurement function, it may alternatively be employed as a combined linear tachogenerator and position measurement device. Throughout this specification it is intended that the term "motor" should be taken to refer to both a combined linear motor and position sensor or a combined linear tachogenerator and position sensor device.

Preferably the magnetic return element is tubular in shape and surrounds the permanent magnetised element and the windings. The permanently magnetised element may be disposed on the axis of the cylindrical soft magnetic element.

A further pair of windings may be located radially adjacent the said two groups of windings. Each of the further windings is preferably located adjacent a respective one of the said two groups of windings. The further windings may be located radially outside the said two groups of windings or radially inside the said two groups of windings.

In an alternative embodiment, the magnetic return element is surrounded by the permanently magnetised element, which is tubular in shape. The pole-pieces are preferably also tubular in shape and coaxial with the permanently magnetised element.

The invention will be further described by way of example with reference to the accompanying drawings in which:

FIG. 6 is a cross sectional diagrammatic view of an integral electric motor and position measurement system constituting a second embodiment of the invention and FIG. 6A is a schematic, perspective view of the coil windings of FIG. 6;

FIG. 7 is a cross sectional diagrammatic view of an integral electric motor and position measurement system constituting a third embodiment of the invention, FIG. 7A is a schematic, perspective view of the position measurement windings of FIG. 7, and FIG. 7B is a schematic, perspective view of the thrust producing windings of FIG. 7.

Figure 1:
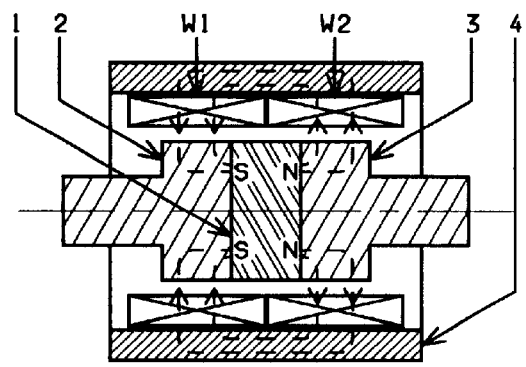
FIG. 1 is a cross sectional diagrammatic view of an electric motor and position measurement system in accordance with the prior art.
Figure 2A:
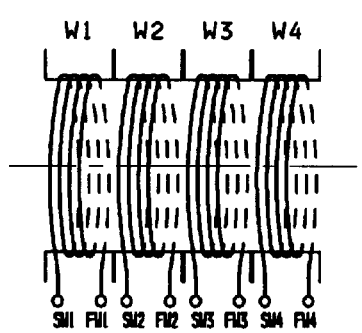
FIG. 2 is a cross sectional diagrammatic view of an integral electric motor and position measurement system constituting a first embodiment of the invention and FIG. 2A is a schematic, perspective view of the coil windings of FIG. 2.
Figure 2:
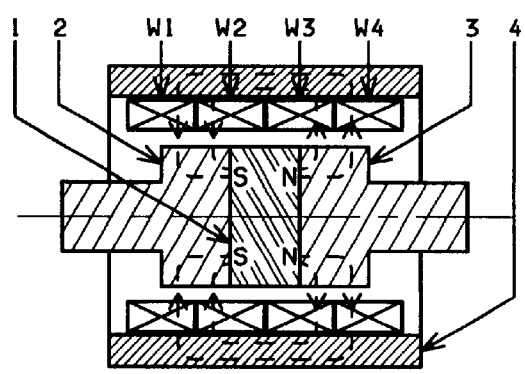

The diagrammatic representation of FIG. 2 shows a permanent magnet 1 whose poles are extended by pole-pieces of high permeability material 2 and 3 to provide the armature or moving element of the assembly. The moving element is cylindrical in shape and is disposed co-axially within a sleeve comprising winding elements W1 and W4. Surrounding the windings and mechanically secured to them is an outer sleeve of high permeability material, 4. Magnetic flux generated by the magnets flows radially between the pole pieces and the surrounding outer sleeve thus intersecting the windings substantially at right angles. The flux generated by the magnet 1 leaves the moving assembly by way of one of the pole-pieces and thus enters by the other. Current flow in the windings results in a force acting axially on them with a corresponding thrust generated between the outer winding and sleeve assembly and the moving magnet and pole-piece assembly.

In order for the forces generated on the windings to act in unison, the reversal of flux flow must be taken into account in the connection of the windings.

Windings W1 to W4 are arranged in two groups, each group being symmetrically displaced in the axial direction about the pole-piece elements 2, 3. The inductance of each winding, being determined by the reluctance of its local magnetic circuit, is influenced by the movement of the pole-pieces particularly since they are displaced from the geometric centre of each winding. Thus for the movement of the magnet and pole-piece assembly shown in FIG. 2 to the right, it can be seen that the inductance of windings W2 and W4 increases whilst that of windings W1 and W3 decreases.

FIG. 2A shows the relative winding directions and terminal arrangements for windings W1 to W4 in the embodiment of FIG. 2.

Figure 3:
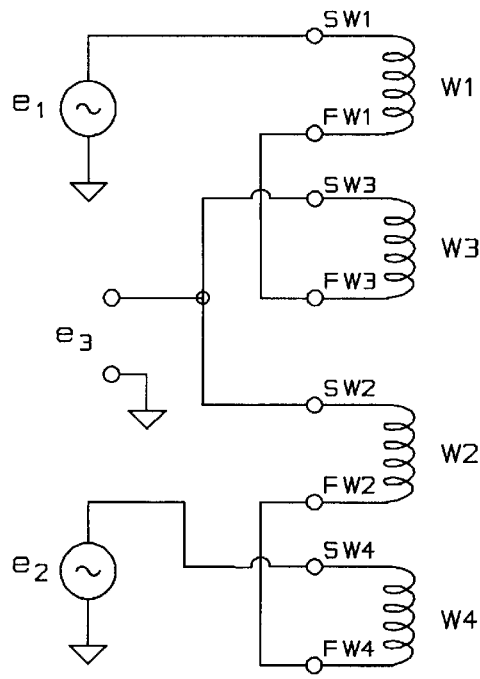
FIG. 3 is a schematic circuit diagram showing a series connection of the windings to achieve position measurement and output thrust.
Figure 4:
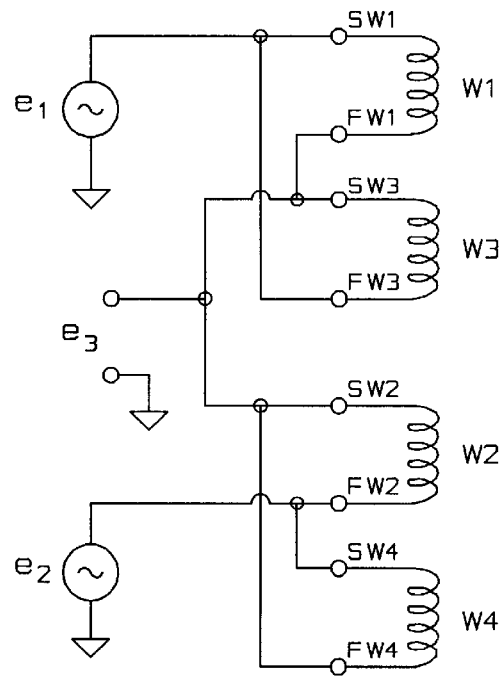
FIG. 4 is a schematic circuit diagram showing a parallel-series connection of the windings to achieve position measurement and output thrust.
Figure 5:
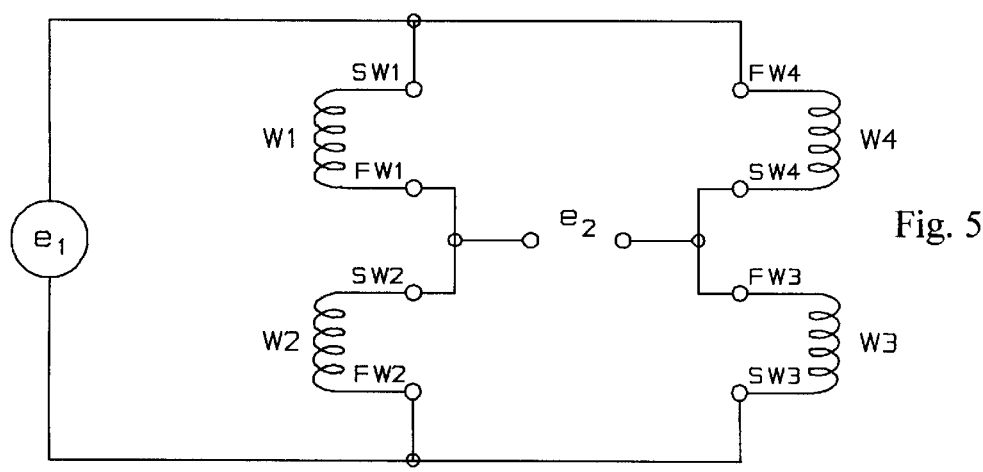
FIG. 5 is a schematic circuit diagram showing a bridge connection of the windings to achieve position measurement and output thrust.

FIGS. 3 to 5 show how the windings are interconnected to provide simultaneous motor action in response to DC current in the windings, and position measurement in response to an impressed AC energising voltage across the windings. FIG. 3 shows a series connection of the windings to form a three terminal connection. Windings W1 and W3 are series connected in one branch and windings W2 and W4 are in series connected in the other.

Anti-phase energising voltages and thrust producing current is impressed on the windings ends from sources e1, e2 and the position signal e3 appears at the junction. This signal varies in magnitude and phase with respect to the AC component of the energising sources e1, e2 as the motor moving assembly is displaced about its centre position. The relative phase of the signal gives the direction of movement and the amplitude represents the magnitude of movement from the centre position. The relative connections of the starts and finishes of the windings ensure that current flow in the windings gives rise to mutually contributing thrust.

FIG. 4 shows a parallel-series connection. Here windings W1, W3 and W2, W4 are grouped into paralleled pairs and then series connected to provide a three terminal connection.

FIG. 5 shows a bridge arrangement where windings W1, W2 and windings W3, W4 are connected in series to form the arms of a bridge or 4 terminal arrangement. The two series arms of the bridge are then paralleled to provide two terminals for application of driving current and excitation voltage from source e1, and the position information appears as a differential signal e2 between the two junctions of the bridge arms. As for the previous cases of FIGS. 3 and 4 the starts and finishes of the windings are arranged to ensure consistent contribution of force from each winding in response to the dc driving current flowing in the windings.

FIG. 6 depicts an alternative configuration of the integral motor and position measurement system. Here the soft iron element 4 is cylindrical in shape and is arranged at the centre of the assembly. Windings W1 to W4 are positioned on the outer cylindrical surface of the element 4 and are mechanically attached to it. Permanent magnet 1 is now tubular in shape and is arranged with tubular shaped pole-pieces 2, 3 at each end. Flux generated by the permanent magnet flows radially from the pole-pieces to the central cylindrical element 4 thus intersecting the windings at right angles. This function of the motor end of the position measurement system is identical to that of the alternative arrangement described earlier. The interconnections of windings of FIGS. 3 to 5 may also be used with this configuration.

FIG. 6A shows the relative winding directions and terminal arrangements for windings W1 to W4 in the embodiment of FIG. 6.

FIG. 7 depicts a further alternative configuration of the integral motor and position measurement system. Here the windings are separated to perform the function of position measurement and generation of output thrust. Windings W1 to W4 are the position measurement windings which are positioned about the centre magnet and pole-piece assembly as described previously, with the exception that they share the annular flux gap with a system of thrust producing windings W5, W6. The windings W1 to W4 are shown positioned concentrically inside the winding layer W5, W6, but they could equally well be positioned as the outer layer or be radially interleaved with the thrust windings. It can be appreciated that this configuration of functionally separate windings could be applied also to the alternative arrangement of FIG. 6.

FIGS. 7A and 7B show the relative winding directions and terminal arrangements for the windings W1 to W4, and W5 and W6 respectively.

In addition to the benefit of providing a combined motor and position sensor, it can be appreciated that the invention offers the option for a device capable of combined linear velocity and linear position sensing. This is so because the high degree of electrodynamic efficiency afforded by the configurations described above applies equally to the case of a permanent magnet machine if it is used as a generator or as a motor; that is if the device is used to generate an EMF in response to an applied velocity or to generate an output thrust in response to an applied driving current. It is well known that the constant or factor relating induced EMF to the relative velocity between the coil assembly and the magnet/pole piece assembly in a given configuration of machine (Volts/Metre/Second), is dimensionally and numerically the same as that relating output thrust to applied current (Newtons/Amp), given of course a consistent set of units such as the SI system.

Many further modifications and variations will suggest themselves to those versed in the art upon reference to the foregoing illustrative embodiments, which are given by way of example only and which are not intended to limit the present invention, the scope of which is determined by the appended claims.

I claim:

1. A linear permanent magnet electric motor comprising:
    a magnetic circuit comprising:
        a permanently magnetised element with first and second soft magnetic pole-pieces, and
        a magnetic return element providing a path via which a permanent magnetic flux flows between the pole-pieces, the pole-pieces respectively defining, in conjunction with the magnetic return element, first and second radial gaps across which the permanent magnet flux flows; and
    a system of windings positioned in the first and second radial gaps and arranged in two groups of two windings, with one group of windings in each of the first and second gaps, such that each group of windings is positioned symmetrically about a nominal geometric center of a respective one of the first and second pole-pieces.

2. An electric motor according to claim 1, wherein the magnetic return element is tubular in shape and surrounds the permanently magnetised element and the windings.

3. An electric motor according to claim 1, wherein the permanently magnetised element is disposed on the axis of the magnetic return element.

4. An electric motor according to claim 1, wherein the permanently magnetised element is tubular in shape and surrounds the magnetic return element.

5. An electric motor according to claim 4, wherein the pole-pieces are tubular in shape and coaxial with the permanently magnetised element.

6. An electric motor according to claim 1, wherein a further pair of windings is located radially adjacent the said two groups of windings.

7. An electric motor according to claim 6, wherein each of the said further windings is located adjacent a respective one of the said two groups of windings.

8. An electric motor according to claim 6, wherein the further windings are located radially outside the said two groups of windings.

9. An electric motor according to claim 6, wherein the further windings are located radially inside the said two groups of windings.

10. A linear permanent magnet electric motor comprising:
    a magnetic circuit comprising:
        a permanent magnetized element with first and second soft magnetic pole-pieces, and
        a magnetic return element providing a path via which a permanent magnetic flux flows between the pole-pieces, the pole-pieces respectively defining, in conjunction with the magnetic return element, first and second radial gaps across which the permanent magnet flux flows; and
    a system of windings positioned in the first and second radial gaps and arranged in two groups of two windings, with one group of windings in each of the first and second gaps, such that each group of windings is positioned symmetrically about a nominal center of magnetic saliency of a respective one of the first and second pole-pieces.

* * * * *